US007078833B2

(12) United States Patent
Xu

(10) Patent No.: US 7,078,833 B2
(45) Date of Patent: Jul. 18, 2006

(54) FORCE MOTOR WITH INCREASED PROPORTIONAL STROKE

(75) Inventor: Yao Hui Xu, Mesa, AZ (US)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/159,217

(22) Filed: May 31, 2002

(65) Prior Publication Data

US 2003/0222534 A1 Dec. 4, 2003

(51) Int. Cl.
*H02K 41/00* (2006.01)

(52) U.S. Cl. ........................... 310/14; 310/12; 310/13; 310/261; 310/15; 310/30; 310/23

(58) Field of Classification Search ................ 335/255, 335/220, 225, 229; 310/261, 12–14, 51
See application file for complete search history.

(56) References Cited

U.S. PATENT DOCUMENTS 3,381,250 A * 4/1968 Weathers .................... 335/255
3,805,204 A * 4/1974 Petersen ..................... 335/255
3,870,931 A 3/1975 Myers
3,900,822 A * 8/1975 Hardwick et al. .......... 335/268
3,970,981 A 7/1976 Coors
4,097,833 A * 6/1978 Myers ........................ 335/261
4,144,514 A * 3/1979 Rinde et al. ................ 335/229
4,651,118 A * 3/1987 Zeuner et al. .............. 335/258
RE32,783 E * 11/1988 Clark ......................... 335/261
4,954,799 A * 9/1990 Kumar ....................... 335/236
5,108,070 A * 4/1992 Tominaga .................... 251/65
5,407,174 A * 4/1995 Kumar .................. 251/129.08
5,787,915 A * 8/1998 Byers et al. ................... 137/1
6,047,672 A * 4/2000 Hanai et al. ............. 123/90.11
6,495,821 B1 12/2002 Smith et al. ........... 250/231.14

FOREIGN PATENT DOCUMENTS

DE 847465 8/1952
EP 204293 * 12/1986
WO WO 9923674 A1 * 5/1999

OTHER PUBLICATIONS

Drawings by IMC Magnetics Corp. (15 sheets) of product that was offered for sale to Eliott Energy Systems of Stuart, Florida. at earliest date of Jun. 15, 1999.

* cited by examiner

*Primary Examiner*—Darren Schuberg
*Assistant Examiner*—Yahveh Comas
(74) *Attorney, Agent, or Firm*—Townsend and Townsend and Crew LLP

(57) ABSTRACT

The force motor of the present invention controls the local magnetic field through a uniquely designed mechanical structure of the internal components. The mechanical structure divides the magnetic field in the force motor into three sections. The force produced on the armature by the magnetic field in the first section increases exponentially as the armature approaches the housing. The force produced on the armature by the magnetic field in the second and the third sections, as the armature approaches the housing, counter balances the rise in the force due to the magnetic field in the first section. Thus, a flat F-S curve over a long stroke length is obtained.

12 Claims, 8 Drawing Sheets

Bp= MAGNETIC FIELD OF
PERMANENT MAGNET

Bi= MAGNETIC FIELD OF COILS

FORCE MOTOR WITH INCREASED PROPORTIONAL STROKE

BACKGROUND OF THE INVENTION

1. Field of the Invention

This disclosure relates generally to a linear actuated force motor that requires low power input and provides a long proportional stroke. More particularly, this disclosure relates to a technique to control local magnetic field distribution so as to provide a long proportional stroke.

2. Description of the Related Art

FIG. 1 shows a cross-sectioned view of a conventional force motor. A conventional force motor includes a shaft 1 mounted in bearings 2 that are mounted in a housing 3. An armature 4 is mounted on the shaft. Two springs 5 and 6 are mounted on the shaft with the armature located between the springs. The springs keep the armature in the neutral position when no net axial force is being exerted on the armature. The armature shaft is free to slide on the bearings in axial directions. A permanent magnet 7 is located at the periphery of the armature. Two coils 8 and 9, wound in the same direction are located on each side of the permanent magnet.

The permanent magnet produces a magnetic field $B_p$. When energized, the coils produce a magnetic field $B_i$. Since the coils are wound in the same direction the magnetic field $B_i$ produced by the coils is in the same direction as the magnetic field $B_p$ on one side of the permanent magnet and in the opposing direction on the other side of the permanent magnet. Thus, the resultant magnetic field on one side of the permanent magnet is $B_p+B_i$ and on the other side of the permanent magnet is $B_p-B_i$. See FIG. 2. The electrical force produced on the armature is proportional to the square of the magnetic field and can be calculated as follows.

$$F=KB^2 \qquad \text{Eqn. 1}$$

Where F=electrical force
B=Magnetic flux density
K=Constant

Using equation 1, the net force on the armature of a force motor when the coils are energized can be calculated as follows:

$$\begin{aligned} F_{fm} &= K\{(B_p+B_i)^2-(B_p-B_i)^2\} \qquad \text{Eqn. 2} \\ &= 4KB_pB_i \end{aligned}$$

For a proportional solenoid wherein a coil produces a magnetic field equal to Bi, the net force on the armature can be calculated using equation 1 as follows:

$$F_{ps}=KB_i^2 \qquad \text{Eqn. 3}$$

Now if $$B_p>B_i$$

then $$4B_p>>B_i$$

Therefore $$F_{fm}>>F$$

Thus, by using a permanent magnet, for a given level of coil energization (i.e. current), the force motor produces larger net force on the armature. Therefore, for a given force requirement the force motor can be operated with lower power input compared to the proportional solenoid. If $B_p$ is assumed to be constant in equation 2, it is clear the net force is proportional to the magnetic field produced by the coils.

$$F_{fm}=CB_i \qquad \text{Eqn. 4}$$

where $C=4KB_p$, assuming $B_p$=constant

Since $B_i$ is proportional to I where I is the current supplied to the coils, $F_{fm}$ is proportional to I i.e. the net force on the armature is proportional to the current supplied to the coils.

However, $B_p$ can be assumed to be constant only when the armature is in the neutral position. As the armature moves away from the neutral position, $B_p$ changes. When the armature moves, $B_p$ on one side of the armature increases whereas $B_p$ on the other side of the armature decreases. This results in a dramatic increase in the net force on the armature. Thus, in a conventional force motor, the force is proportional to the stroke only within a small range of the stroke, for example 0.01 to 0.03 inches.

U.S. Pat. No. 5,787,915 describes a conventional force motor having a permanent magnet and coils. However, it does not teach any means of providing increased proportional stroke.

U.S. Pat. No. 3,900,822 (the '822 Patent) describes a conventional proportional solenoid with a conical pole piece on each side of the bobbin. When the solenoid is energized, the armature is pulled to one side and enters into the conical pole piece. The conical pole piece provides a leakage flux path and thereby reduces the increase in the net force on the armature. The proportional solenoid similar to that of the '822 Patent requires higher power input compared to the force motor of the present invention to produce the same amount of force on the armature.

The use of a conical pole piece as taught by the '822 Patent does not provide a substantial increase in proportional stroke. Additionally, when a conical pole piece is used, the proportionality and the constancy of the net force on the armature gets worse with increase in current (I) supplied to the coils or when the plunger position changes.

SUMMARY

None of the above mentioned patents teach a force motor with a long proportional stroke with a flat force versus stroke characteristic (F-S curve) and low power input.

The force motor of the present invention overcomes the aforesaid shortcomings of the prior art by controlling the local magnetic field through a uniquely designed mechanical configuration of the internal components. The mechanical configuration divides the magnetic field in the force motor into three sections. In operation, as the armature moves in the axial direction towards the end of the stroke, the force exerted on the armature by a magnetic field in the first section increases exponentially. At the same time, the force exerted by the magnetic field in the third section either has a smaller increase compared to the first section, or decreases. As the armature moves towards the stop, the amount of magnetic flux in the second section increases. The direction of this magnetic field is perpendicular to the armature's direction of movement and therefore does not produce any force in the direction of the movement thereby reducing the total force on the armature. By adjusting the mechanical parameters associated with the three sections, the net axial force on the armature can be controlled, thereby providing, for a given power level, a flat force vs. stroke curve over a long stroke.

It is an object of the present invention to provide a force motor with low power input to achieve a desired force with a flat F-S curve and long proportional stroke when compared to a conventional proportional solenoid. These and other objects are accomplished by providing a housing and an armature movable along an axial direction in the housing wherein the shape of the armature and the housing cooperate to produce a flat F-S curve for the force motor. The invention further contemplates a method of controlling the magnetic field in a force motor to obtain a flat F-S curve by forming a first section having a first magnetic field that produces a force on the armature that increases as the armature approaches the housing and forming a second section and a third section in the force motor. The force on the armature due to the a second magnetic field in the second section and a third magnetic field in the third section, as the armature approaches the housing, counter balances the force on the armature produced by the first magnetic field in the first section to produce the flat F-S curve.

Also provided is a housing having an internal wall, a cylindrical extension projecting from the internal wall working as a stop to limit the armature's movement, and a concave surface formed on the internal wall. An armature supported by the bearing sits in the housing. The armature includes a cylindrical portion connected to a conical section. The shape of the armature and the housing are such that they cooperate to produce a flat F-S curve for the force motor.

Further features and advantages will appear more clearly on a reading of the detailed description, which is given below by way of example only and with reference to the accompanying drawings wherein corresponding reference characters on different drawings indicate corresponding parts.

DETAILED DESCRIPTION

Figure 3:
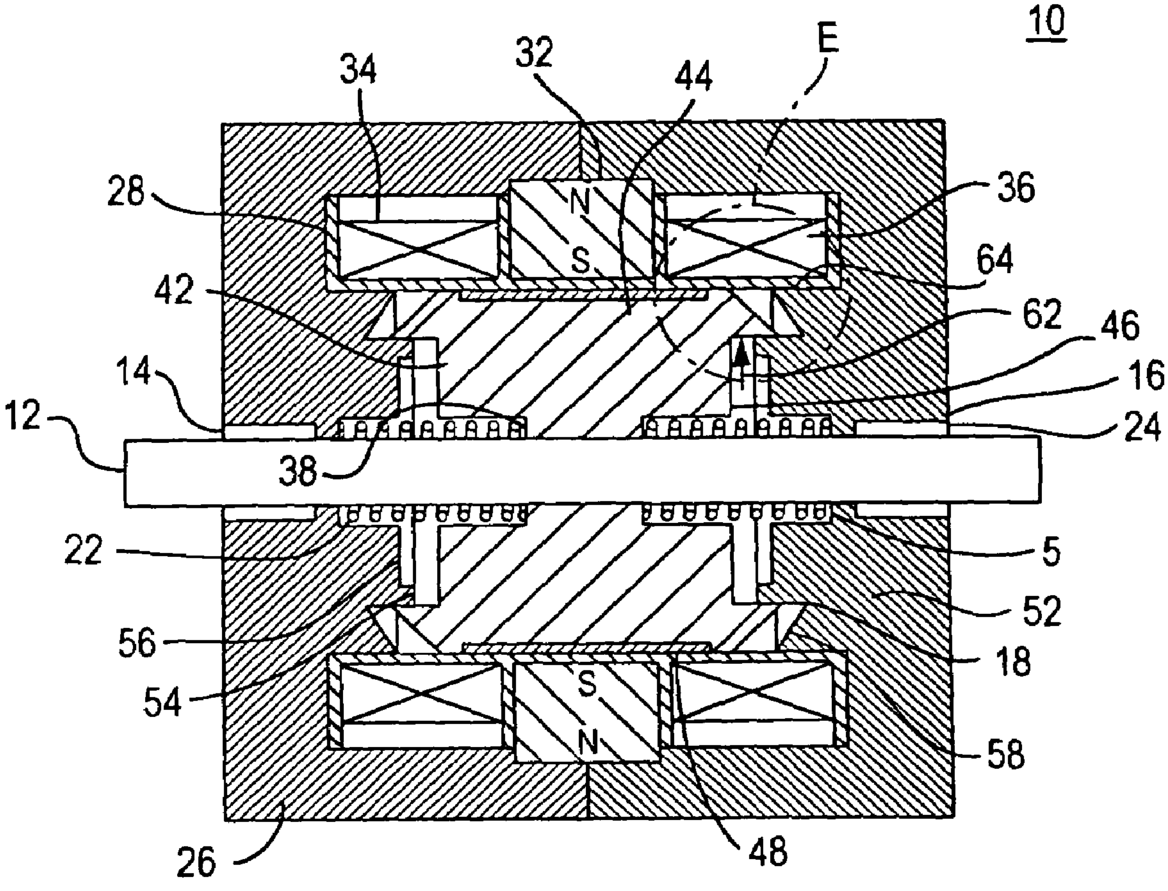
FIG. 3 is a cross-sectional view of the force motor of the present invention.
Figure 4:
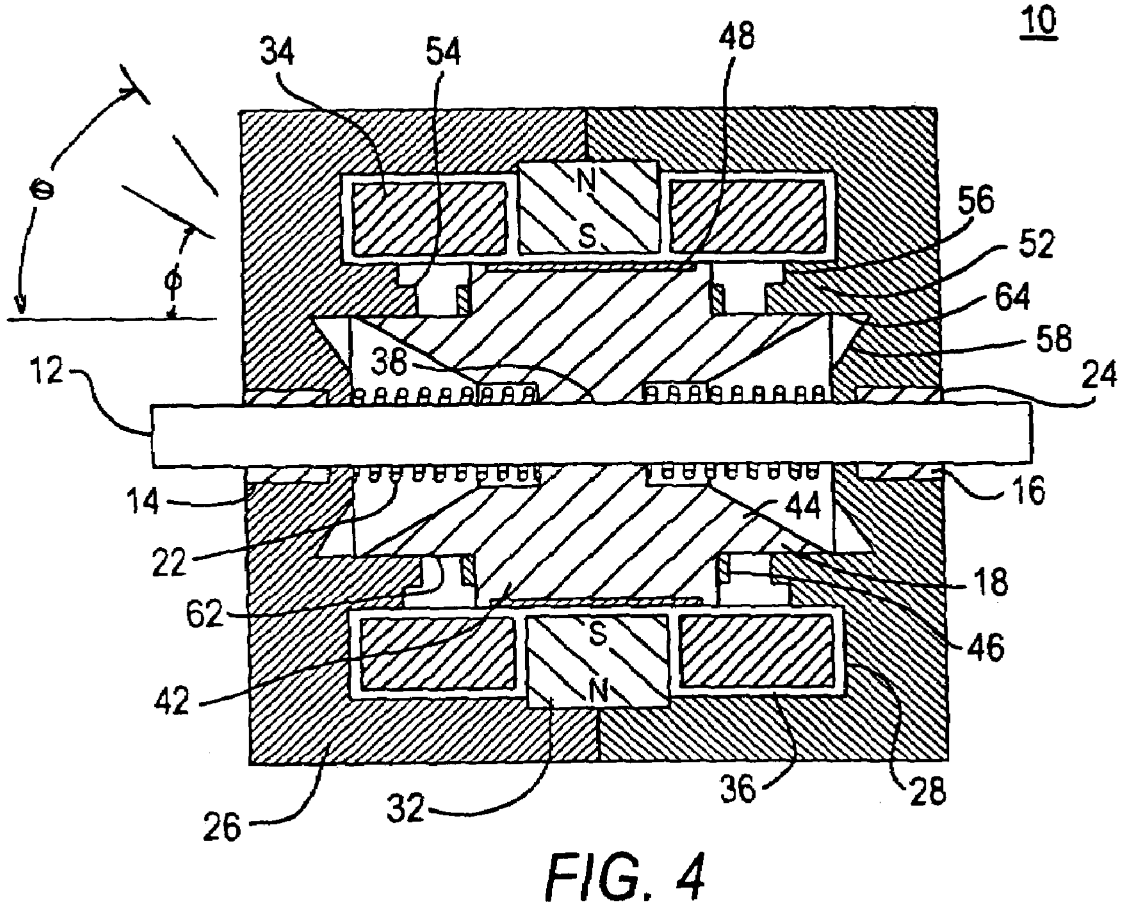
FIG. 4 is a cross-sectional view of another embodiment of the force motor of the present invention.

FIG. 3 shows a cross-sectional view of the force motor of the present invention. FIG. 4 shows cross-sectional view of another embodiment of the force motor of the present invention. Force motor 10 includes a shaft 12 which is slidably mounted in bearings 14 and 16. Armature 18 is firmly mounted on shaft 12. Springs 22 and 24 are mounted along shaft 12, one on each side of armature 18. The assembly of shaft 12, bearings 14 and 16, armature 18 and springs 22 and 24 is mounted in a housing 26. A bobbin 28 is enclosed within housing 26 and is located at the periphery of armature 18. Bobbin 28 forms three compartments. In the center compartment is located a permanent magnet 32. Bobbin 28 prevents contaminants from magnet 32 from falling on the armature 18. Coils 34 and 36 are located one on each side of magnet 32 in the compartments formed by bobbin 28.

Armature 18 is symmetric around the shaft 12 and includes a base 38 connected to a cylindrical portion 42 (see FIG. 3) which in turn is connected to a conical section 44 having cylindrical face 62 (formed by a counter-bore. In embodiment of FIG. 3, the large end of the conical section 44 is larger than the cylindrical portion 42. In the embodiment of FIG. 4 base 38 is connected to conical section 44 having a cylindrical face 62 which in turn is connected to cylindrical portion 42. In embodiment of FIG. 4, the large end of the conical section 44 is larger than the cylindrical portion 42. Armature 18 and housing 26 are all made of a ferro-magnetic material that form a magnetic circuit. A stainless steel shim 46 is mounted on cylindrical portion 42 of armature 18. By varying the thickness of shim 46, the travel of armature 18 along shaft 12 can be increased or decreased; a thicker shim 46 resulting in a shorter travel distance. Between bobbin 28 and armature 18, along the periphery of armature 18, is located a cylindrical copper layer 48 that is firmly attached to the armature 18. Copper layer 48 induces back EMF to dampen the unexpected movement of the armature caused by vibration, shock, and acceleration.

An internal wall 56 of housing 26 is shaped to form a stop 52. The shape of stop 52 cooperates with the shape of armature 18 to provide control of the magnetic field in the area surrounding the cooperating shapes. Stop 52 includes a cylindrical extension 54 which projects from internal wall 56 of housing 26. Stop 52 also has a concave conical surface 58 formed on wall 56. Conical surface 58 corresponds to the conical section 44 on armature 18. Cylindrical extension 54 corresponds to the cylindrical portion 42 and in cooperation with steel shim 46 determines the maximum stroke length of armature 18.

When coils 34 and 36 are energized by current I, magnetic field $B_i$ is produced. Magnetic field $B_i$ interacts with magnetic field $B_p$ as described previously in reference to the conventional force motor. The action of these two magnetic fields combined produces a net force $F_{fm}$ on armature 18. However, as compared to the conventional force motor, the force $F_{fm}$ for a given I remains constant over a longer stroke length for the reasons explained below.

Figure 5:
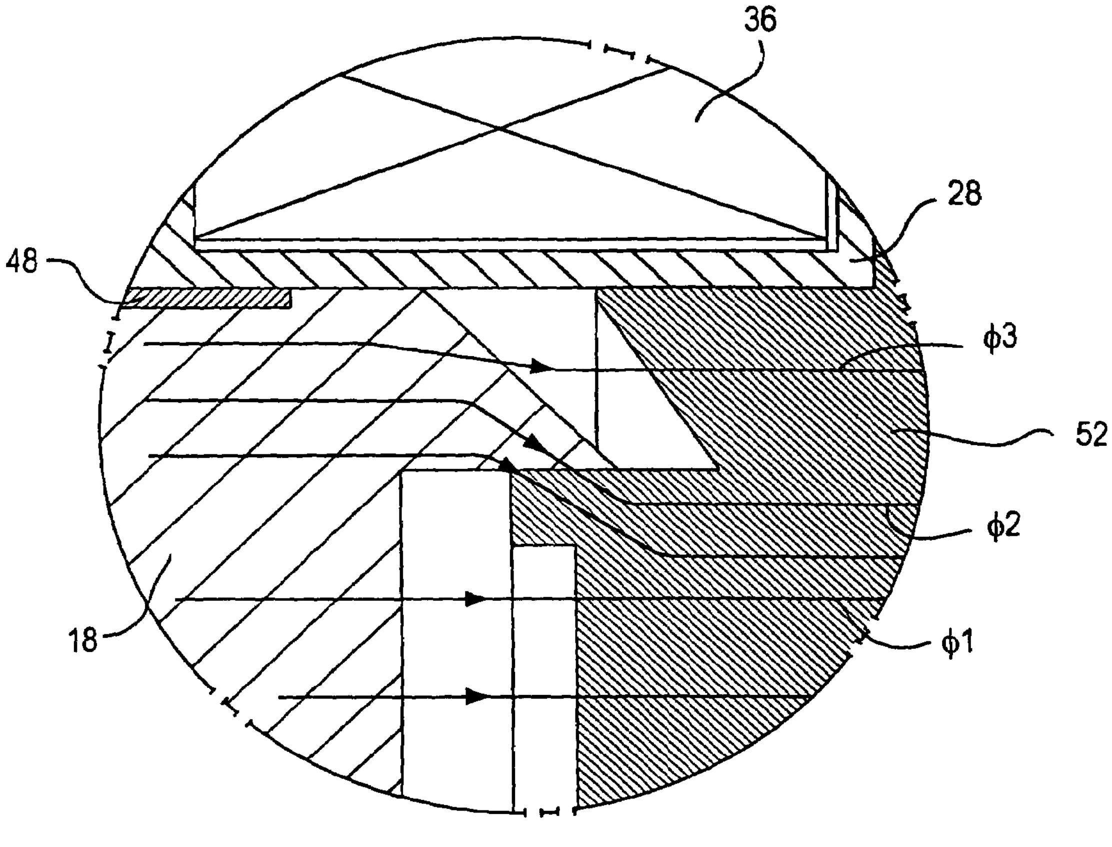
FIG. 5 is an enlarged view of cooperating mechanical structures of the force motor shown as detail E in FIG. 3.
Figure 6:
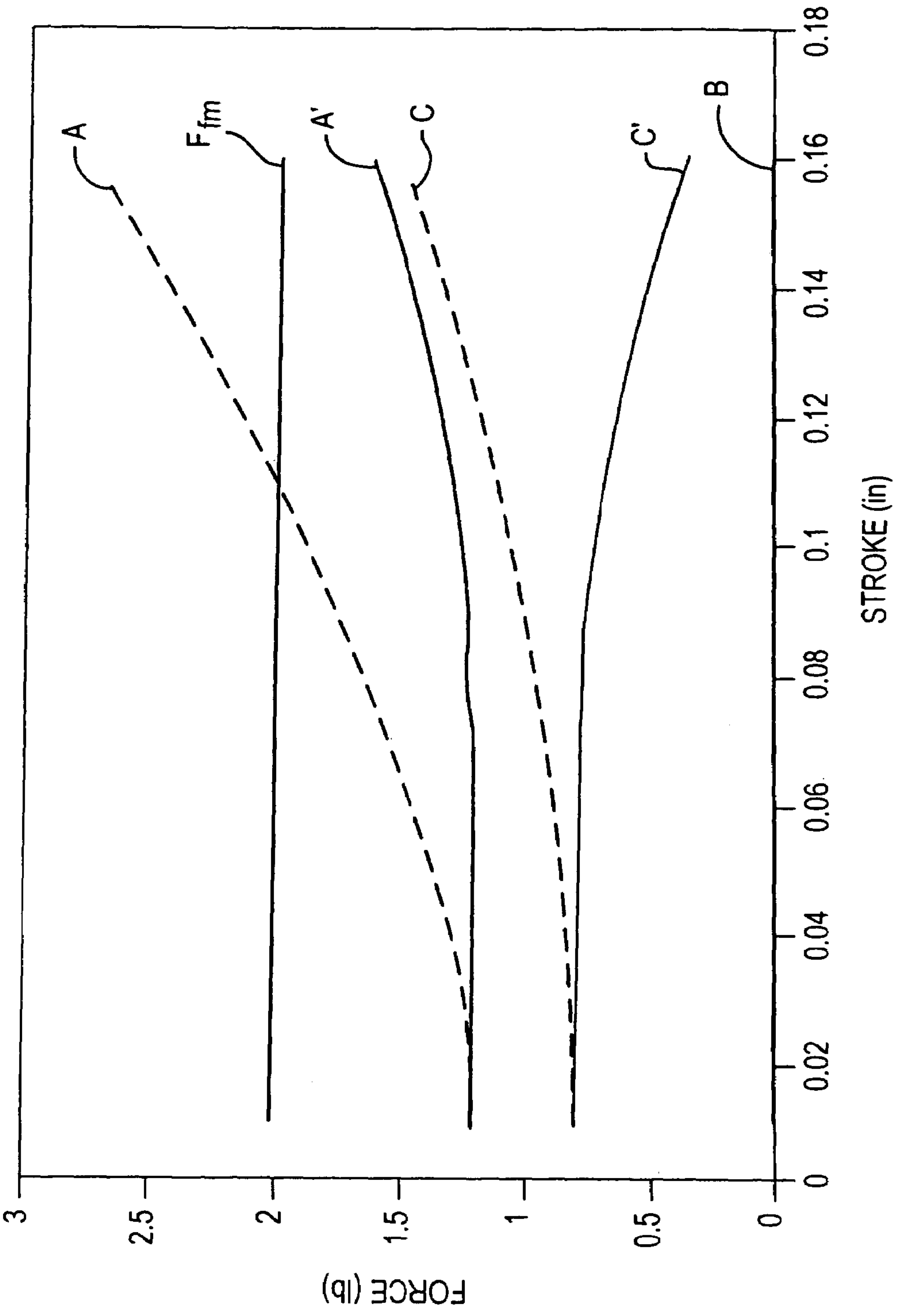
FIG. 6 is a conceptual representation of the F-S curve for the three sections formed by the cooperating sections of FIG. 5.

Force motor 10 of the present invention has shaped armature 18 and stop 52. The magnetic field between armature 18 and stop 52 is divided into three sections. FIG. 5 is the enlarged view of cooperating mechanical structures of armature 18 and stop 52. Also shown in FIG. 5 are the three sections formed by the cooperating mechanical structures. FIG. 6 shows a conceptual representation of the forces in the three sections formed by the cooperating mechanical structures.

The first section is the magnetic field $\Phi_1$ formed between cylindrical portion 42 and internal wall 56. This is equivalent to a magnetic field inside a solenoid with flat-faced-armature. The characteristics of the force produced by this field are essentially exponential increase when the solenoid is pulled-in towards the stop (see curve A in FIG. 6).

The second section is the magnetic field $\Phi_2$ located between face 62 of conical section 44 on the armature 18 and the face 64 of cylindrical extension 54. As a greater portion of face 62 slides along face 64, $\Phi_2$ increases. Since $\Phi_2$ is perpendicular to the direction of motion of armature 18, it does not produce any significant force in the direction of motion. Line B in FIG. 6 is a conceptual representation of the force produced by $\Phi_2$, that is about zero all over the stroke length.

The third section is the magnetic field $\Phi_3$ located between conical section 44 on armature 18 and the conical face 58 on stop 52. It is equivalent to a force in a conical-faced-armature solenoid. The characteristics of this force curve produced by $\Phi_3$ is that it is flatter than that of the first section. (See curve C on FIG. 6 for a conceptual representation).

When the armature is pulled-in, the second section of magnetic field $\Phi_2$ takes away the magnetic flux from the first section and the third section. Therefore, the force produced by $\Phi_1$ and $\Phi_3$ is actually reduced due to the increase of leakage flux in the second section, and the force-stoke curves produced by the magnetic field of the first section and the third section drop down (see curve A' and C' on FIG. 6).

The resultant force $F_{fm}$ exerted on armature 18 of force motor 10 is the sum of the force represented by curve A', B, and C'. i.e.

$$F_{fm}=F_{\Phi 1}+F_{\Phi 2}+F_{\Phi 3} \qquad \text{Eqn. 5}$$

Thus, by adjusting the cooperating mechanical structures on armature 18 and stop 52, for example, by varying the shape, size and angles of cooperating mechanical elements, a desired force—stroke characteristics curve can be achieved. Adjustment of force—stroke characteristics may also be done by use of materials with different magnetic properties. A flat F-S curve advantageously allows the use of springs with a smaller spring constant, to have wide range of control and more precise control.

Figure 1:
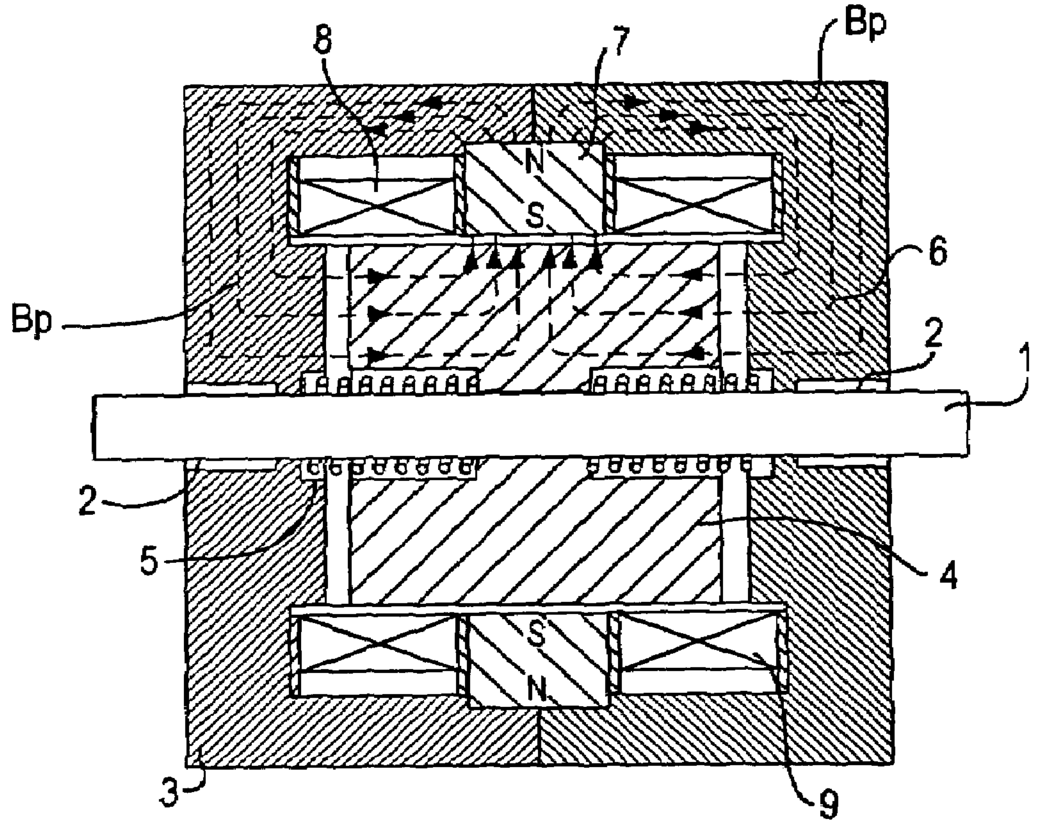
FIG. 1 PRIOR ART
FIG. 1 is a cross-sectional view of a prior art force motor.
Figure 2:
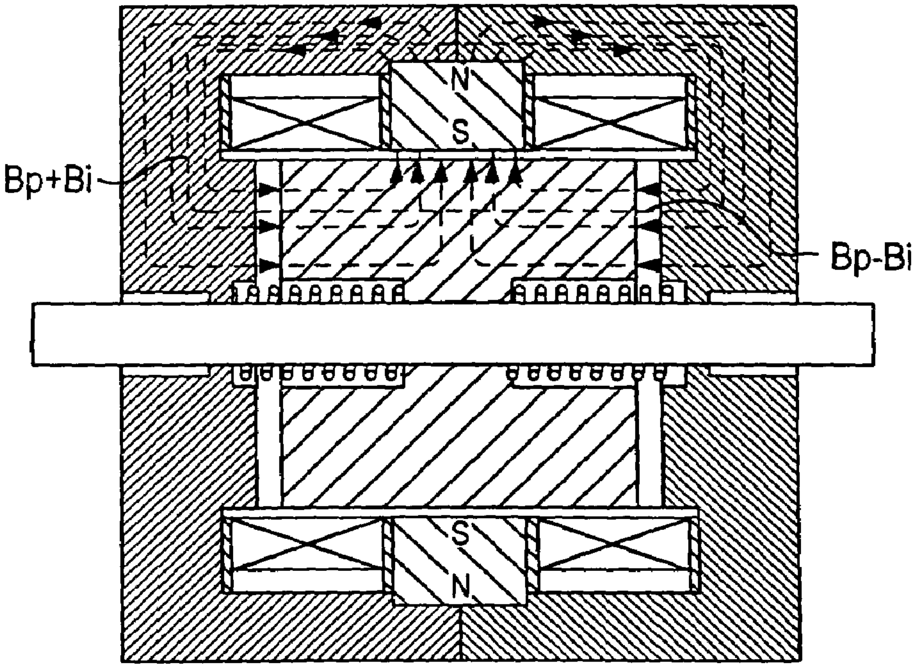
FIG. 2 PRIOR ART
FIG. 2 shows a magnetic field produced in the force motor of FIG. 1.
Figure 7:
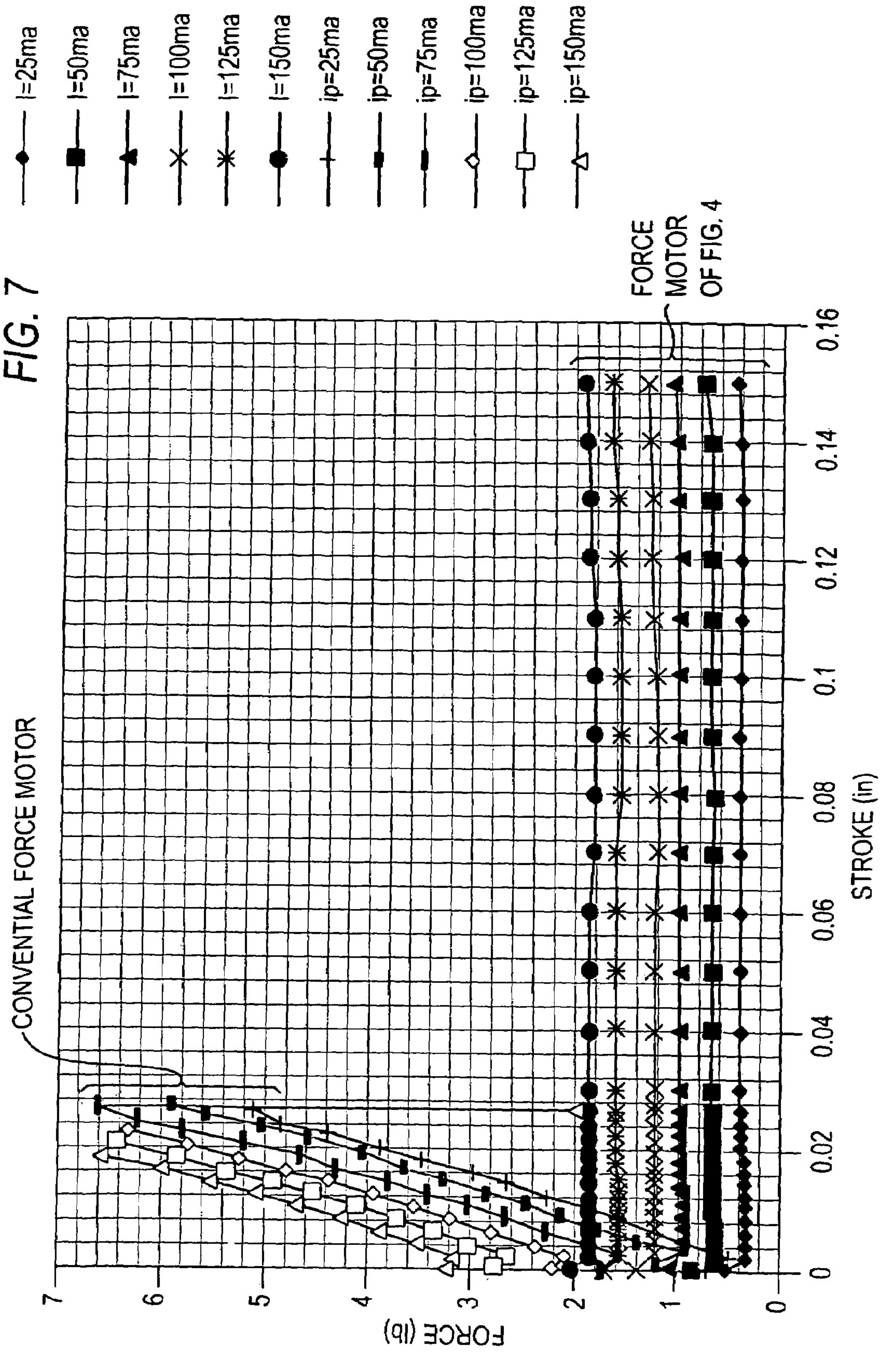
FIG. 7 shows F-S curves for a conventional force motor of FIG. 1 having a greater slope and F-S curves for the force motor of FIG. 4 which are flat.
Figure 8:
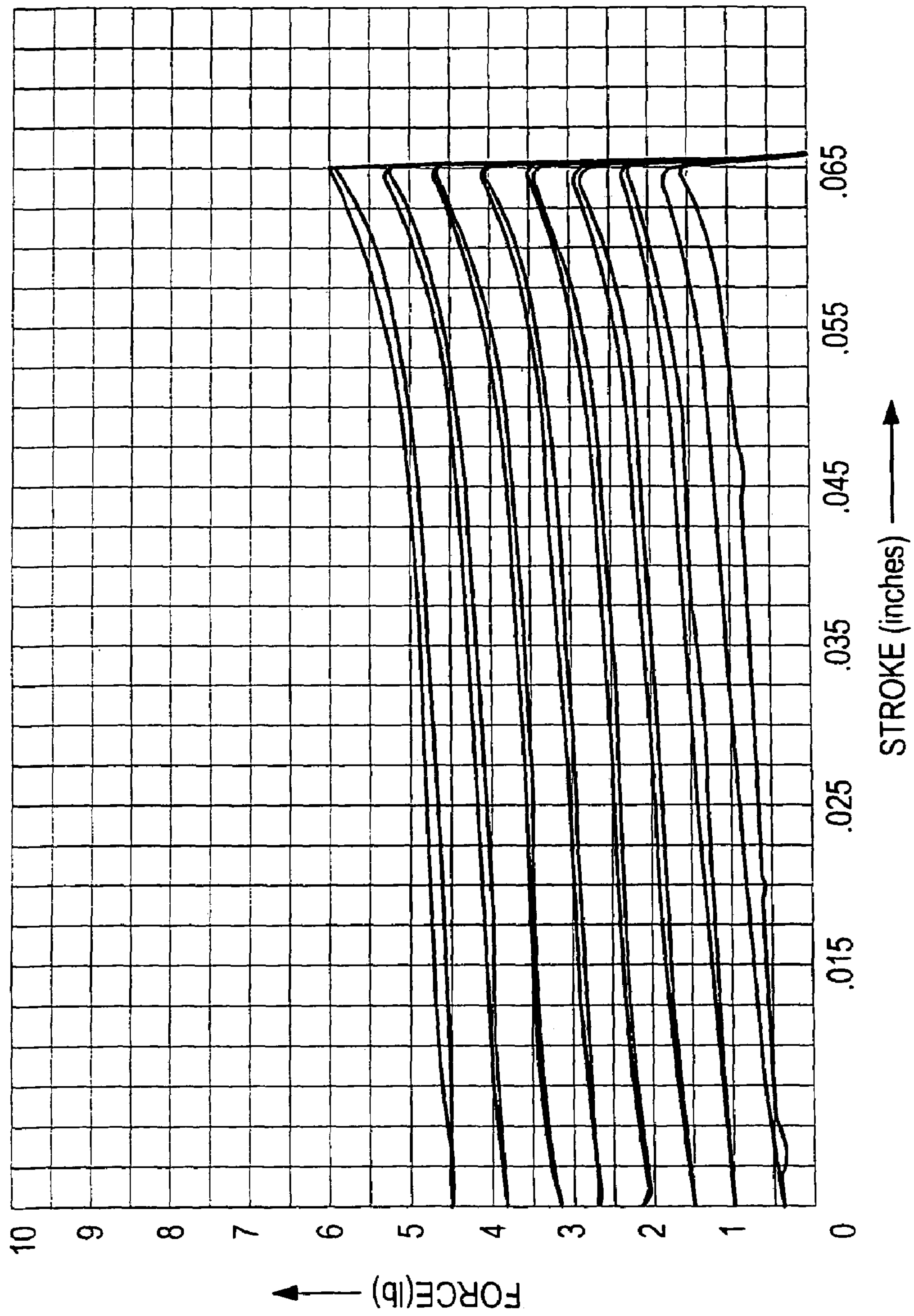
FIG. 8 shows F-S curves for the force motor of FIG. 3.

FIG. 7 shows F-S curves for a conventional force motor such as shown in FIG. 1 and force motor 10 of the present invention as shown in FIG. 4 for comparison. FIG. 8 shows the F-S curves for the embodiment of the force motor 10 shown in FIG. 3. The embodiments shown in FIG. 3 and FIG. 4 have a flat F-S curve over the stroke length of 0.0 to 0.065 in. and 0.0 to 0.16 in., respectively while the conventional force motor only has proportional stroke of 0.0 to 0.025 in. The force motors used to obtain the curves had the same external dimensions, used a similar magnet, used similar coils and had the same armature diameter. The only difference between the motors was the presence of cooperating mechanical structures as described previously in reference to force motor 10. The F-S curves for the conventional force motor are the ones with greater slope and shorter stroke. On the other hand, the F-S curves for the force motor 10 are very much flat over a greatly longer stroke, the proportional stroke length being (0.15 inches) six times the proportional stroke length (0.025 inches) for the conventional force motor. In FIG. 7, the substantially constant force is between 0.2 and 2 lbs. with a variation of about 0.2 lbs. maximum for any curve. In FIG. 8, the substantially constant force is 0.4 to 5.5 lbs. with a variation of about 1.5 lbs. for any one curve.

The invention controls the slope of the F-S curve even if the slope is not driven to zero. As shown in FIG. 8, there may be a slight slope.

While a preferred embodiment of the invention has been described, various modifications will be apparent to one skilled in the art in light of this disclosure and are intended to fall within the scope of the appended claims. For example, the local magnetic field may be controlled be varying the shape and size or location of the mechanical configurations in a different manner than described here. The local magnetic field control may also be achieved by using different materials with different magnetic properties.

I claim:

1. A force motor comprising:

a shaped housing having:

an internal wall:

a cylindrical extension projecting from the internal wall; and a concave surface formed on the internal wall;

a bobbin mounted in the shaped housing;

a permanent magnet mounted in the bobbin, the bobbin isolating the magnet from the armature thereby Preventing contaminants from depositing on the armature;

a cylindrical layer located between the bobbin and the armature, the cylindrical layer being made from an electric conductor and attached firmly on the armature, thus dampening the movement of armature due to vibration or shock;

a shaped armature mounted in the shaped housing; wherein the shape of the armature and the housing cooperate to produce a flat F-S curve for the force motor, and wherein the shaped armature comprises:

a cylindrical portion;

a conical section, the large end of the conical section being larger than the cylindrical portion; and a cylindrical face formed at the junction of the cylindrical portion and the conical section, the cylindrical face extending from the outer surface of the cylindrical portion to the tip of the large end of the conical section, and wherein the cylindrical portion, the conical section and the cylindrical face at the junction of the cylindrical portion and the conical section are made from materials with different magnetic properties.

2. The force motor of claim 1, wherein the internal wall, the cylindrical extension projecting from the internal wall and the concave surface formed on the internal wall are made from materials with different magnetic properties.

3. The force motor of claim 1, further comprising:

a shim mounted on the armature, the shim in cooperation with the cylindrical extension limiting the length of the stroke for the force motor.

4. The force motor of claim 1, further comprising;

a first section formed by the internal wall and the cylindrical portion;

a second section formed by the cylindrical face and the cylindrical extension; and a third section formed by the conical section and the concave conical surface, wherein a force produced on the armature by a magnetic field in the first section is counterbalanced by the force produced on the armature by magnetic fields in the second section and the third section to produce a flat F-S curve.

5. The force motor of claim 1, wherein the conductive cylindrical layer is located in the magnetic field of the permanent magnet so that any movement due to shock or vibration will induce an electromotive force in the conductive layer thereby damping the movement.

6. A force motor comprising:

a shaped housing;

a shaped armature mounted in the shaped housing, the shaped of the armature and the housing cooperating to produce a flat F-S curve for the force motor;

a bobbin mounted in the housing;

a permanent magnet mounted in the bobbin, the bobbin isolating the magent from the armature thereby preventing contaminants from depositing on the armature; and a cylindrical layer located between the bobbin and the armature, the cylindrical layer being made from an electric conductor and attached firmly on the armature, thus dampening the movement of the armature due to vibration or shock.

7. The force motor of claim 6, further comprising:

a shim mounted on the armature; and a cylindrical extension formed in the housing, the shim in cooperation with the cylindrical extension limiting the length of the stroke for the force motor.

8. The force motor of claim 6, wherein the conductive cylindrical layer is located in the magnetic field of the permanent magnet so that any movement due to shock or vibration will induce and electromotive force in the conductive layer thereby damping the movement.

9. A force motor comprising:

a shaped housing, the shaped housing having a first conical surface;

a shaped armature mounted in the shaped housing, the shaped armature having a second conical surface, the angle of the first conical surface and the angle of the second conical surface being selected to produce a magnetic field that when combined with the magnetic fields between other portions of the shaped armature and the shaped housing will result in a flat F-S curve for the force motor;

a bobbin mounted in the housing;

a permanent magnet mounted in the bobbin, the bobbin isolating the magnet from the armature thereby preventing contaminants from depositing on the armature; and a cylindrical layer located between the bobbin and the armature, the cylindrical layer being made from an electric conductor and attached firmly on the armature, thus dampening the movement of the armature due to vibration or shock.

10. The force motor of claim 9, further comprising:

a shim mounted on the armature; and a cylindrical extension formed in the housing, the shim in cooperation with the cylindrical extension limiting the length of the stroke for the force motor.

11. The force motor of claim 10, wherein the conductive cylindrical layer is located in the magnetic field of the permanent magnet so that any movement due to shock or vibration will induce and electromotive force in the conductive layer thereby damping the movement.

12. A force motor comprising:

a shaped housing;

a bobbin mounted in the shaped housing;

a permanent magnet mounted in the bobbin, the bobbin isolating the magnet from the armature thereby preventing contaminants from depositing on the armature;

a cylindrical layer located between the bobbin and the armature, the cylindrical layer being made from an electric conductor and attached firmly on the armature, thus dampening the movement of armature due to vibration or shock;

a shaped armature mounted in the shaped housing; wherein the shape of the armature and the housing cooperate to produce a flat F-S curve for the force motor, and wherein the shaped armature comprises:

a cylindrical portion;

a conical section, the large end of the conical section being larger than the cylindrical portion; and a cylindrical face formed at the junction of the cylindrical portion and the conical section, the cylindrical face extending from the outer surface of the cylindrical portion to the tip of the large end of the conical section.

* * * * *